Patented Jan. 16, 1923.

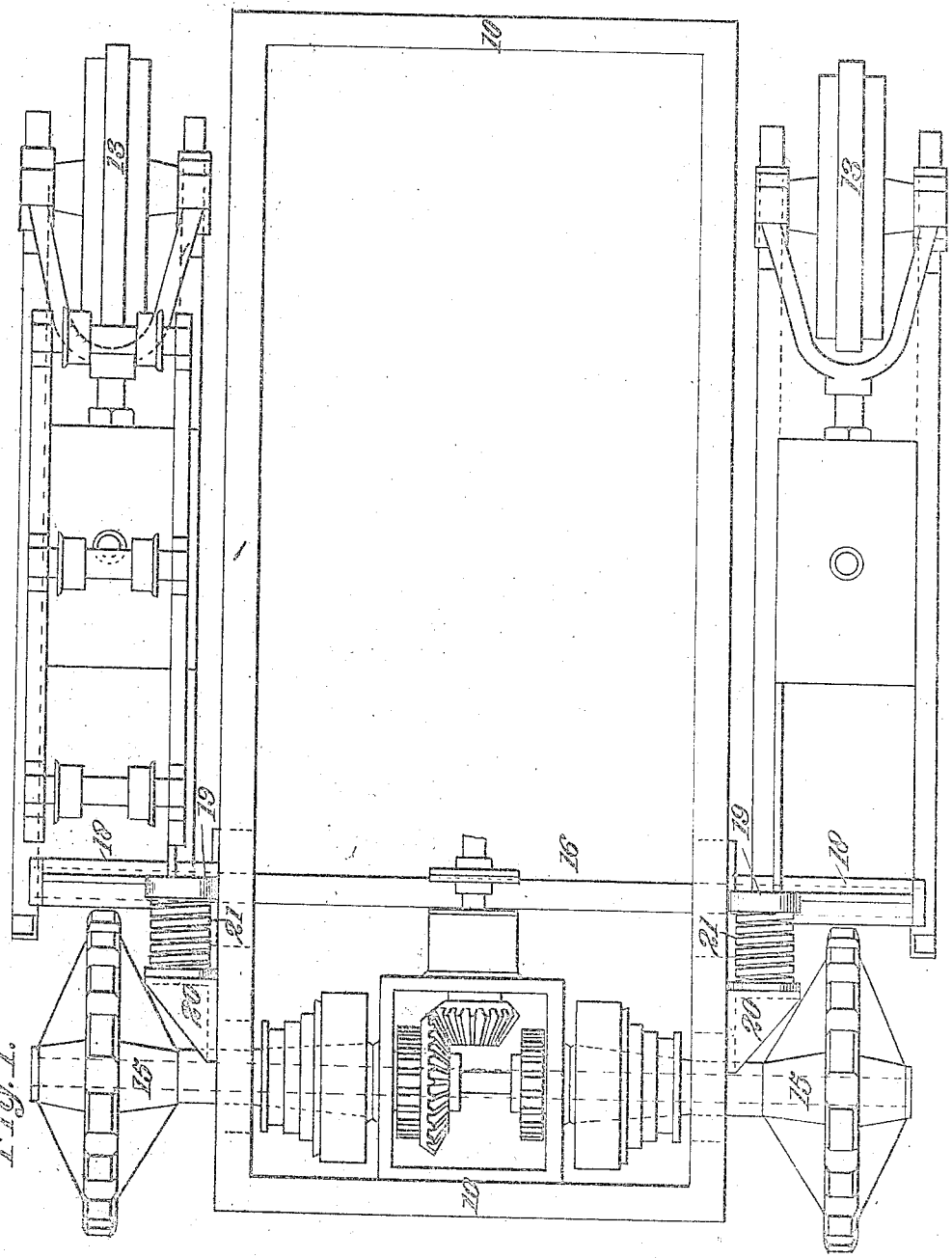

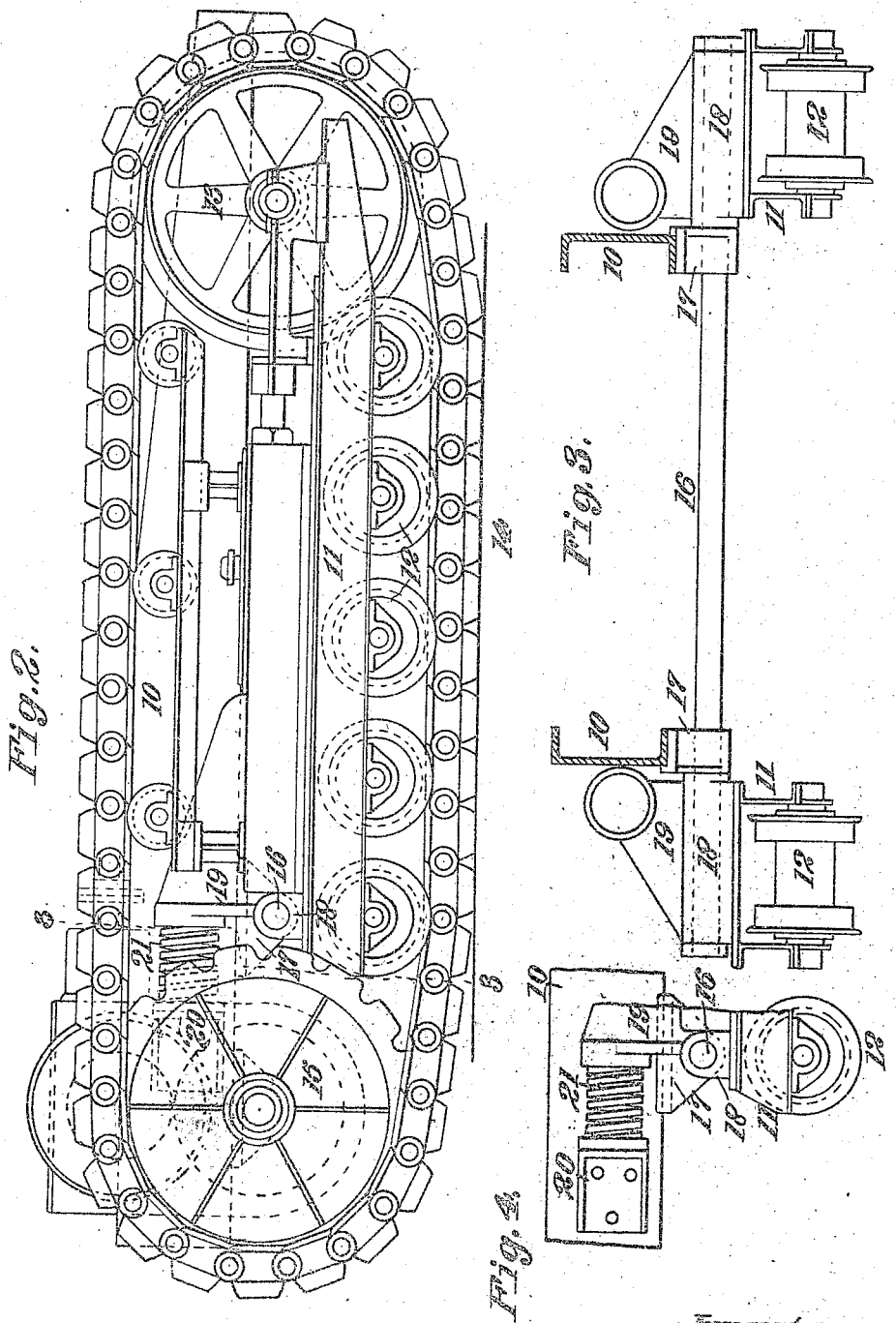

1,442,550

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR FRAME SUSPENSION.

Application filed September 29, 1919. Serial No. 327,222.

*To all whom it may concern:*

Be it known that I, ELMER E. WICKERSHAM, a citizen of the United States, residing at Stockton, in the county of San Joaquin and State of California, have invented new and useful Improvements in Tractor Frame Suspensions, of which the following is a specification.

This invention relates to chain track tractors, and more particularly to means for suspending the main frame upon the truck mechanisms.

In my prior application, Serial No. 314,205, filed July 30th, 1919, I have shown a suspension wherein the main frame is supported entirely at a single point on each of the truck mechanisms. The present application contemplates the same general method of supporting the main frame, but discloses a specifically different form of mechanism for this purpose wherein the parts have been simplified and improved.

Referring to the accompanying drawings:

Fig. 1 shows a plan view of a tractor embodying my invention.

Fig. 2 shows a side elevation of the same.

Fig. 3 shows a sectional view taken on the line 3—3 of Fig. 2.

Fig. 4 shows a detail view in elevation of one of the stabilizing springs.

As shown herein, a tractor main frame is indicated at 10 and is supported upon a self-laying track truck mechanism arranged at each side thereof. This truck mechanism comprises in general a truck frame 11 upon which is journaled a series of rollers 12 and an idler sprocket wheel 13 journaled at the forward end thereof. An endless chain track 14 is carried at its forward run upon the idler sprocket wheel 13 and forms a track for the rollers 12. A driving sprocket wheel 15 for the chain track is arranged at the rear and is journaled upon the main frame separate from the roller truck frame 11.

For supporting the main frame upon the roller truck frames I employ a single transversely extending axle 16 fixed in supports 17 on the main frame having outwardly extending ends received in bearing members 18 on each truck frame. An upstanding bracket 19 is formed on each bearing member 18 and a laterally extending bracket or lug 20 is fixed to the main frame at the rear of the bracket 19. An extensible coiled spring 21 is interposed between the lug 20 and bracket 19.

In the operation of the tractor the main frame is supported entirely through the axle 16 upon the roller truck frames. The location of this axle 16 is to the rear of the center of weight of the main frame, and any tendency of the main frame to drop down at its forward end is restrained by the coiled springs 21. The presence of the driving sprocket wheels 15 at the rear of the main frame makes it impossible for the front end of the main frame to be tilted upwardly to any great extent independently of the roller truck frames.

Each roller truck frame is free to rock about the axle 16 to permit it to pass over irregularities in the surface of the roadway. An upward movement of one of the truck mechanisms will move the bracket 19 in a manner to compress the coiled spring 21 and thus the rocking movement of the truck mechanism is cushioned. Each truck mechanism may rock about the axle 16 without imparting movement to the opposite truck mechanism. In the prior application referred to an upward movement of one truck mechanism tended to impart a downward movement to the opposite truck mechanism. In the present case this reverse action has been omitted without sacrificing any of the advantages thereof. The main frame will still be supported in a substantially horizontal position at all times and it will likewise be cushioned. The present mechanism is greatly simplified over the mechanism of my prior application and is considerably easier to assemble and not so likely to get out of repair.

Having thus described my invention, what I claim and desire to secure by Letters Patent is:

1. In a vehicle, a main frame, a chain track truck mechanism at each side thereof, a pivotal supporting connection for the entire weight of the main frame at a single point on each truck mechanism and yielding means interposed between each truck mechanism and the main frame to stabilize the main frame, said stabilizing means being in vertical alignment with the pivotal supporting connection and permitting each truck mechanism to rock about its point of support without imparting movement to the other truck mechanism.

2. In a vehicle, a main frame, a chain track truck mechanism at each side thereof, a supporting connection for the entire weight of the main frame at a single point on each truck mechanism, means to stabilize the main frame, said means permitting each truck mechanism to rock about a point of support without imparting movement to the other truck mechanism and comprising a rock arm on each truck mechanism in vertical alignment with said pivotal supporting connection and yielding means interposed between the rock arm and the main frame.

3. In a vehicle, a main frame, a chain track truck mechanism at each side thereof, a pivotal supporting connection for the entire weight of the main frame having a single point of connection with each truck mechanism and comprising an axle on the main frame arranged to the rear of the center of weight of the main frame and on which the truck mechanisms are journaled and yielding means interposed between each truck mechanism and the main frame to stabilize the main frame, said stabilizing means being in vertical alignment with the pivotal supporting connection and permitting independent rocking movement of the truck mechanisms.

4. In a vehicle, a main frame, a chain track truck mechanism at each side thereof, a supporting connection for the entire weight of the main frame having a single point of connection with each truck mechanism and comprising an axle on the main frame arranged to the rear of the center of weight of the main frame and on which the truck mechanisms are journaled, means to stabilize the main frame, said means comprising a rock arm on each truck mechanism in vertical alignment with the axle and a spring connecting the rock arm to the main frame.

5. In a vehicle, a main frame, a chain track truck mechanism at each side thereof, a supporting connection for the entire weight of the main frame having a single point of connection with each truck mechanism and comprising an axle on the main frame arranged to the rear of the center of weight of the main frame and on which the truck mechanisms are journaled, means to stabilize the main frame, said means comprising a rock arm on each truck mechanism in vertical alignment with the axle, a pressure spring acting upon said rock arm at the rear thereof and an abutment for the pressure spring formed on the main frame.

6. In a tractor, a main frame, a chain track truck mechanism at each side thereof comprising a truck frame on which is journaled a series of supporting rollers and an idler sprocket wheel, means for supporting the entire weight of the main frame at a single point on each of said truck frames comprising an axle having a pivotal connection with each truck frame at the rear of the latter, a yielding connection interposed between each truck mechanism and the main frame in vertical alignment with the axle, said connection permitting each truck mechanism to rock about its pivotal mounting independent of the main frame and of each other, and a driving sprocket wheel for the chain track journaled directly upon the main frame to the rear of the truck frame, said driving sprocket wheel acting also to prevent a downward tilting of the rear end of the main frame independent of the truck frames.

In testimony whereof I have hereunto set my hand in the presence of two subscribing witnesses.

ELMER E. WICKERSHAM.

Witnesses:
W. W. HEALEY,
J. H. HERRING.